United States Patent
Hara

(10) Patent No.: US 7,826,158 B2
(45) Date of Patent: Nov. 2, 2010

(54) LENS DRIVE UNIT INSTALLATION STRUCTURE AND LENS DRIVE UNIT

(75) Inventor: Tatsunori Hara, Saitama (JP)

(73) Assignee: Tamron Company, Ltd., Saitama (JP)

( * ) Notice: Subject to any disclaimer, the term of this patent is extended or adjusted under 35 U.S.C. 154(b) by 0 days.

(21) Appl. No.: 12/411,627

(22) Filed: Mar. 26, 2009

(65) Prior Publication Data

US 2009/0251810 A1    Oct. 8, 2009

(30) Foreign Application Priority Data

Apr. 3, 2008    (JP) .............................. 2008-097476

(51) Int. Cl.
*G02B 7/02*    (2006.01)
*G02B 15/14*    (2006.01)

(52) U.S. Cl. ........................ 359/824; 359/819; 359/696

(58) Field of Classification Search ......... 359/694–701, 359/819–824; 396/72, 73, 349
See application file for complete search history.

(56) References Cited

U.S. PATENT DOCUMENTS 6,046,864 A * 4/2000 Onda .......................... 359/819
6,970,303 B2 * 11/2005 Makii et al. ................. 359/696
7,349,166 B2 * 3/2008 Sakai et al. ................. 359/822

FOREIGN PATENT DOCUMENTS

| JP | 2004133054 A | 4/2004 |
| JP | 2006251197 A | 9/2006 |

* cited by examiner

*Primary Examiner*—Mohammed Hasan
(74) *Attorney, Agent, or Firm*—Rothewell, Figg, Ernst & Manbeck, P.C.

(57) ABSTRACT

The present invention aims to provide a lens drive unit installation structure which enhances dust resistance to improve reliability and realizes miniaturization and easiness to assemble. For achieving the purposes, the lens drive unit installation structure for installing a lens drive unit including: a lens holding frame for holding a lens, and a lens moving mechanism for slidingly move the lens holding frame in the direction of an optical axis using a drive source, wherein the drive source to be linked with the lens moving mechanism is arranged on the side of the lens holding frame view from the direction of the optical axis, and a partition is set between the lens holding frame and the drive source, thereby the lens and the drive source are arranged separately from each other.

20 Claims, 5 Drawing Sheets

LENS DRIVE UNIT INSTALLATION STRUCTURE AND LENS DRIVE UNIT

BACKGROUND OF THE INVENTION

1. Field of the Invention

The present invention relates to a lens drive unit including a lens holding frame for holding a lens and a lens moving mechanism for slidingly move the lens holding frame using a drive source, and in particular to a installing structure thereof.

2. Description of the Related Art

For optical zooming system of an imaging device, a system in which a plurality of lens groups (a zooming lens group, a focus lens group) is provided, and the system in which these lens groups are made to move in the direction of an optical axis to zoom and focus. A lens drive unit provide the lens holding frame which is holding a lens along the optical axis are arranged in series so as to be able to slide in the optical axis direction, and it make a lens holding frame to slide by a drive source. For the drive source to slidingly move the lens group holding frame, a motor is widely used. Then, it controlling precisely positions of the lens groups by a mechanism which is provided that detects a position of the lens group holding frame by using detection means and controls the motor in response to the position of the lens group holding frame.

For example, Japanese Patent Application Publication No. 2004-133054 discloses a lens barrel in which include a second group lens as a zoom lens are held by a second group frame and a third group lens as a focus lens are held by a third group frame, then a first step motor for driving the second group frame to move in front-back direction and a second step motor for driving the third group frame to move in front-back direction are fixed to a inside of a left side wall as a first outer wall of a fixed frame at the left side of each frames. The lens barrel includes detection means for detecting a position of the holding frame, and a motor terminal provided in a motor unit and the detection means are connected to a flexible printed circuit board and controlled. A lens drive unit disclosed in Japanese Patent Application Publication No. 2004-133054, for the purposes of miniaturization and a simplified structure, has a drive mechanism and the lens groups arranged adjacent to each other.

In the conventional technology described above, dust may unavoidably come into the inside of a lens barrel. Dust is likely to gather particularly to a motor because it generates heat due to its operation, and when a drive mechanism and a lens group are, as disclosed in Japanese Patent Application Publication No. 2004-133054, arranged adjacent to each other, dust is also likely to gather to the lens group in conjunction with motor operation. As a result, dust may affect imaging performance due to its attachment to a lens or cause a malfunction of a lens group holding frame due to its attachment to the drive mechanism, thus possibly causing adverse effect.

Concerning this point, in the case of a collapsible lens barrel, there is an example in which a foreign substance removal mechanism is provided at a gap or inside of the lens barrel which is likely to through enter dirt or dust. The collapsible lens barrel, for example, an image pickup device disclosed in Japanese Patent Application Publication No. 2006-251197, includes an outer tube and an inner tube which situate inside of a fixed cylinder and slide back and forth from a front end of the fixed cylinder in the direction of an optical axis, and the outer tube hold an auto focus lens group and the inner tube hold a zoom lens group. Then, for zooming and focusing, drive force of a drive motor is transmitted to a gear to slide the outer tube and the inner tube in the direction of an optical axis, thus making a small gap lead from the outside. To prevent a foreign substance from entering into the inside of the lens barrel through the gap in this sliding portion, an adhesive layer is provided in the gap portion to cause the foreign substance to adhere thereto.

However, a non-collapsible lens barrel according to Japanese Patent Application Publication No. 2004-133054, compared with a collapsible lens barrel, has an advantage that a mechanism thereof can be miniaturized. Besides, a mechanism of a lens drive unit is getting complicatedly to set detection means and control means are provided to control a position of a lens group holding frame, and accordingly, it has been a challenge on how to lay out a component for the purpose of miniaturization, and when a foreign substance removal mechanism is further added, it is difficult to lay out a small lens barrel.

Therefore, an object of the present invention is to provide a lens drive unit installation structure which enhances keeping out dust to improve reliability and realizes miniaturization and easiness to assemble.

SUMMARY OF THE INVENTION

The inventor, as the result of intense study, has achieved the object described above by adopting a lens drive unit installation structure and a lens drive unit described below.

A lens drive unit installation structure for installing a lens drive unit including: a lens holding frame for holding a lens, and a lens moving mechanism for slidingly move the lens holding frame in the direction of an optical axis using a drive source, wherein the drive source to be linked with the lens moving mechanism is arranged on the side of the lens holding frame view from the direction of the optical axis, and a partition is set between the lens holding frame and the drive source, thereby the lens and the drive source are arranged separately from each other.

A lens drive unit installation structure for installing a lens drive unit including: a lens holding frame for holding a lens, and a lens moving mechanism for slidingly move the lens holding frame in the direction of an optical axis using a drive source, wherein the lens moving mechanism and the drive source to be linked with it are arranged on the side of the lens holding frame view from the direction of the optical axis, and a partition is set between the lens moving mechanism and the drive source, thereby the lens and the drive source are arranged separately from each other.

In a lens drive unit installation structure according to the present invention, more preferably, a lens holding frame are housed in the lens housing, the partition is a part of the lens housing.

In a lens drive unit installation structure according to the present invention, more preferably, a motor as the drive source is arranged outside of and adjacent to the partition, a window for pass through an output shaft is formed in the partition, and a bearing for an output shaft of the motor is put into the window by insertion, thereby the motor is positioned to the partition.

In a lens drive unit installation structure according to the present invention, more preferably, a lens holding frame and the lens moving mechanism are housed in the lens housing, a motor as the drive source is arranged outside of and adjacent to the lens housing, a window for pass through an output shaft is formed in a wall of the lens housing on the side where the motor is arranged, and the motor is arranged separately in a state that drive transmission means provided in the lens moving mechanism for transmitting drive force of the motor to the lens holding frame and the motor are connected to each other at the output shaft window.

In a lens drive unit installation structure according to the present invention, more preferably, a drive source fixing boss to fix the motor is formed in the partition.

A lens drive unit installation structure according to the present invention, more preferably, a window for a position detection sensor is formed in the partition to arrange the position detection sensor detecting a displacement position of the lens holding frame.

A lens drive unit installation structure according to the present invention, more preferably, a mechanical stopper mounting portion provided on the partition to set a mechanical stopper which restrict a displacement range of the lens group holding frame.

A lens drive unit according to the present invention has a feature of being assembled using the lens drive unit installation structure described above.

The lens drive unit installation structure according to the present invention houses a lens holding frame and a drive source separately from each other to prevent dust or dirt from entering into the inside of a lens housing, thus being able to prevent the dust or dirt from adhering to a lens and a moving mechanism for the lens group holding frame. As a result, a highly reliable lens drive unit can be provided. Further, a partition is used to both position other components and form a fixing frame, besides providing a dust prevention effect, thus being able to enhance accuracy in linking components of the lens drive unit with each other.

DETAILED DESCRIPTION OF THE PREFERRED EMBODIMENTS

Now, best modes of a lens drive unit installation structure according to the present invention will be described with reference to the accompanying drawings. Note that the present invention should not be limited to illustrated embodiments.

Figure 1:
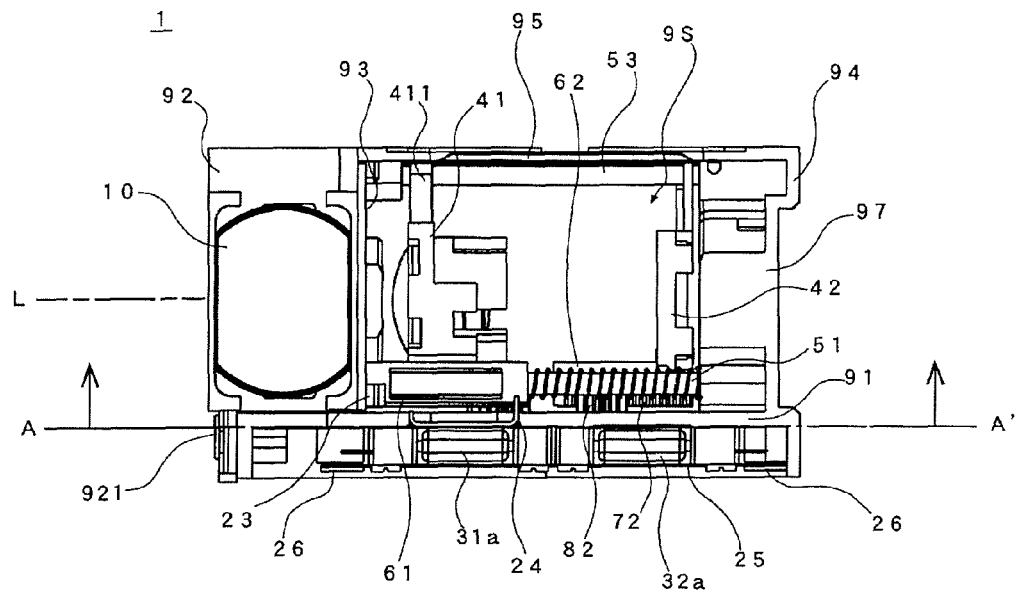
FIG. 1 is a plan view showing an embodiment of a lens drive unit using a lens drive unit installation structure according to the present invention.
Figure 2:
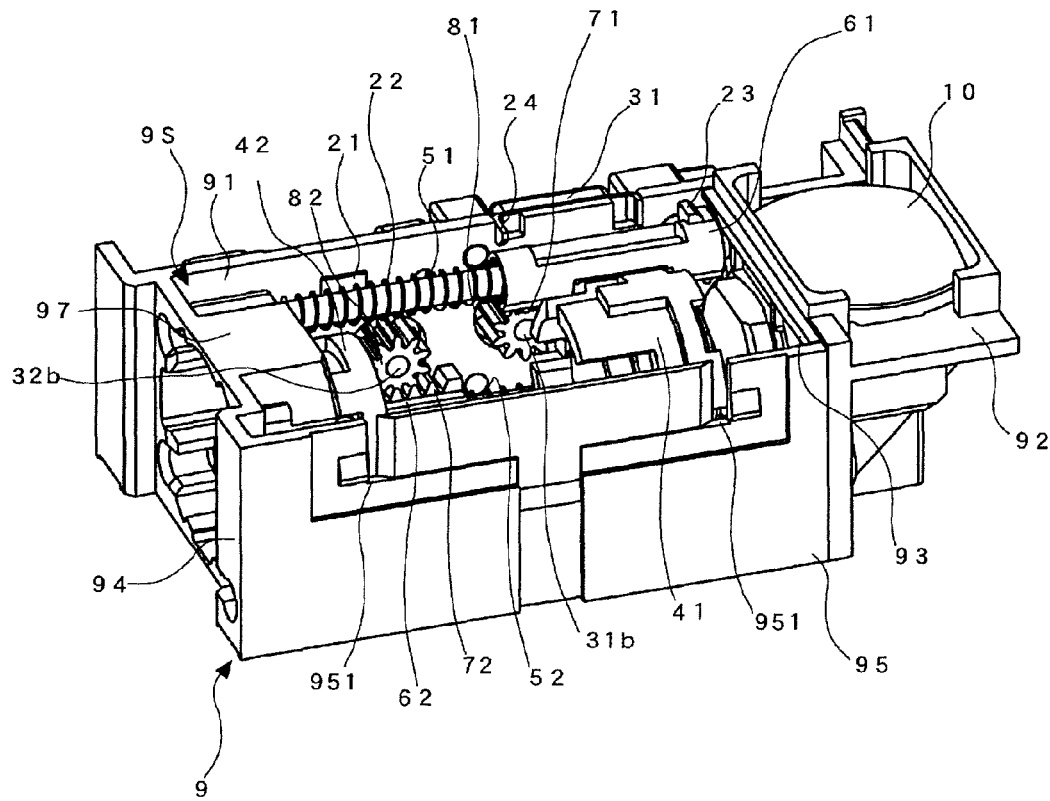
FIG. 2 is a perspective view of the lens drive unit shown in FIG. 1.

A lens drive unit installation structure according to the present invention is the structure for installing a lens drive unit including: a lens holding frame for holding a lens, and a lens moving mechanism for slidingly move the lens holding frame using a drive source. FIG. 1 is a top view showing an embodiment of the lens drive unit according to the present invention, and FIG. 2 is a perspective view of the lens drive unit shown in FIG. 1. The lens drive unit 1 shown in FIG. 1 and FIG. 2 includes a lens moving mechanism and motors 31, 32 as a drive source for the lens moving mechanism. The lens drive unit 1 according to the present embodiment make a first lens group holding frame 41 and a second lens group holding frame 42 to slide by using a first motor 31 and a second motor 32 independently and respectively along an optical axis L of lens.

A lens moving mechanism 2 is the structure mainly composed of lens group holding frames 41, 42, guide poles 51, 52, guide portions 61, 62 and drive transmission means (racks 71, 72, pinions 81, 82), for slidingly move the lens group holding frames 41, 42. The lens moving mechanism 2 holds lens groups for an image pickup device in two lens group holding frames (first lens group holding frame 41, second lens group holding frame 42), respectively.

The lens group for an image pickup device is the group in which a plurality of lenses is combined with each other and set with their optical axes being aligned with an optical axis L, and, for example, the group is used as a focus lens or a zoom lens. The lens group holding frames 41, 42 hold the lens group so that the lens group is inserted thereinto to fix, and optical axes are aligned with an optical axis of a fixed lens provided in a lens barrel. Accordingly, the lens group holding frame holding a zoom lens or a focus lens is moved in the direction of the optical axis L of the lens, thereby an optical zoom function and an optical focus function can be performed.

In the lens moving mechanism 2 according to the present embodiment, two guide poles are arranged parallel to the optical axis L on outer edges of the lens group holding frames 41, 42. The lens group holding frames 41, 42 are latched on the guide poles 51, 52, thus being supported while restricting the direction in which the lens group holding frames 41, 42 are moved.

The first lens group holding frame 41 and the second lens group holding frame 42 are linked with a first guide member 61 and a second guide member 62 on the outer edges of the lens group holding frames 41, 42, respectively. The guide members 61, 62 form a tubular shape having a sleeve into which the guide pole 51 or 52 can be inserted, and the guide poles 51, 52 are inserted into the sleeves, respectively, thereby the lens group holding frames 41, 42 are supported by the guide poles 51, 52 in a slidable manner.

Further, the lens group holding frames 41, 42 are supported by an auxiliary guide pole 53 in a slidable manner, besides the guide poles 51, 52, which can prevent minute deviation of the optical axis of the lens caused by sliding movement. In this case, auxiliary holding portions 411, 421 are provided to latch the auxiliary guide pole 53 on the outer edges of the lens group holding frames 41, 42.

Drive transmission means transmits movement from the drive source to the lens group holding frames 41, 42 as linear movement in the direction of sliding movement along the optical axis L. In this embodiment, the drive transmission means has adopted pinions 81, 82 provided on output shafts 31b, 32b of the motors 31, 32 as the drive source, and racks 71, 72 formed on the side of the lens group holding frames 41, 42. That is, the pinions 81, 82 are mounted on rotating output shafts 31b, 32b of the motors 31, 32, respectively, and the racks 71, 72 are mounted on the side of the lens group holding frames 41, 42, respectively. The pinions 81, 82 are provide to gear with the racks 71, 72, respectively, which converts rotating movement of the motors 31, 32 into linear movement in the direction in which the lens group holding frames 41, 42 are slidingly moved, thus being transmitted.

The motors 31, 32 are used as drive means to slidingly move the lens group holding frame. The motors 31, 32 used are desirably a flat motor having a thin thickness in the direction of the output shaft. In the lens drive unit according to the present invention, the motors 31, 32 (drive source) are arranged on the side of the lens group holding frames in the direction of the optical axis. Then, in the embodiment, the output shafts 31*b*, 32*b* of the motors 31, 32 are set in the direction perpendicular to the direction in which the lens group holding frames are slidingly moved (optical axis L). Accordingly, use of the flat motor allows the length of the motors 31, 32 in the direction of the output shafts 31*b*, 32*b* to be made short, which can miniaturize the lens drive unit, thus being suitable for miniaturizing the lens barrel in the width direction.

In the lens drive unit installation structure according to the present invention, the drive source to be linked with the lens moving mechanism is arranged on the side of the lens holding frame view from the direction of the optical axis. Then, the lens drive unit installation structure offers a feature that a partition is provided between the lens group holding frame and the drive source, and a region for setting the lens holding frames is used as a lens housing, thus the lens and the drive source are arranged separately from each other.

Further, in the lens drive unit installation structure according to the present invention, the lens moving mechanism and the drive source to be linked with it may be arranged on the side of the lens holding frame view from the direction of the optical axis. Then, the lens drive unit installation structure offers a feature that a partition is provided between the lens moving mechanism and the drive source, thus the lens and the drive source are arranged separately from each other. A method for positioning separately, in this embodiment, is shown as the method that, using a housing 9 shown in FIG. 3, the lens moving mechanism 2 is housed in a lens housing 9S, the motors 31, 32 as the drive source are arranged outside of and adjacent to the lens housing 9S, thus housing the lens moving mechanism 2 and the motors 31, 32 so that they are separated from each other.

Figure 3:
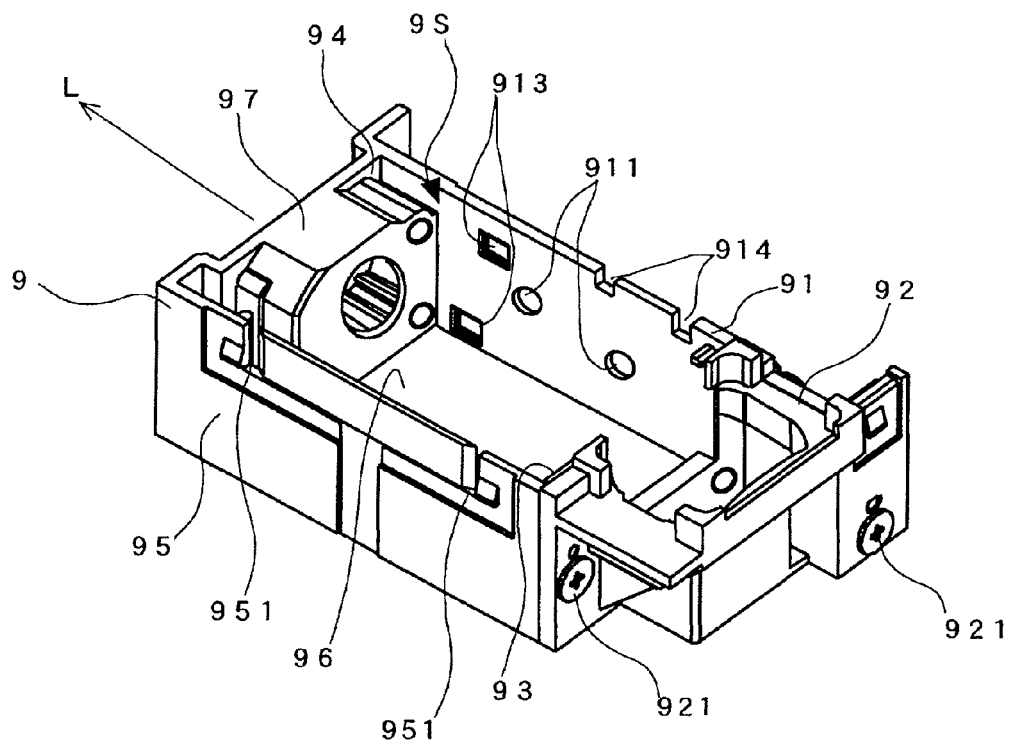
FIG. 3 is a perspective view showing a housing of the lens drive unit shown in FIG. 1.

A housing 9, as shown in FIG. 3, has an approximately rectangular parallelepiped shape and is formed by drilling, machining or the like of a molded body made of a resin or metal. The housing 9 includes the lens housing 9S for housing the lens moving mechanism 2 and a prism housing part 92 for housing a prism 10 for refracting a light flux from an object, in series along the optical axis L.

The lens housing 9S is composed of a first wall 93 on the side of an object, a second wall 94 on the side of an image plane, a third wall 91 and a fourth wall 95 providing side walls, and a base 96. In the present embodiment, on the side of the lens drive unit in the direction of the optical axis, the motors 31, 32 are arranged side-by-side with the third wall 91 (partition) there between. In other ward, the third wall 91 is a partition which is separated between a lens driving mechanism and a driving resource.

Note that the lens housing 9S may be able to house the lens and connect the motors 31, 32 to the drive transmission means with the partition there between, and the lens housing 9S may have, not limited to the approximately rectangular parallelepiped shape as shown in FIG. 3, a tubular shape or a special shape fitting an outline of the lens moving mechanism 2. Also, to reduce size and weight of the lens drive unit, various mechanisms of the drive transmission means and the like are preferably centralized and disposed on the side of the lens group holding frame. Then, the partition more preferably combines a dust prevention function with a function of mounting various mechanisms of the lens drive unit and positioning them. In this case, a wall surface (third wall 91) on the side of the lens housing 9S of the lens group holding frame view from the direction of the optical axis L is used as the partition between the lens moving mechanism 2 and the motors 31, 32. Then, at least a portion of the partition used to mount and/or position the various mechanisms of the lens drive unit is preferably formed so as to be approximately planar at a position where the portion is parallel to the optical axis. This can eliminate inefficiency from a layout of the lens drive unit, make it easier to form and machine the housing 9S, facilitate positioning and/or mounting the various mechanisms in production, and also improve accuracy of the position detection function of the lens group holding frame.

On the first wall 93, a prism housing part 92 is arranged adjacent to it, and a holding window for holding an end of the lens moving mechanism 2 is formed. On the holding windows, the prism 10 and the end of the lens moving mechanism 2 on the side of the first lens group holding frame 41 are placed, respectively. The prism housing part 92 is fixed, while housing the prism 10, by machine screws 921 from outside of the first wall 93 of the housing 9S.

In the second wall 94, a fixed lens insertion hole is formed, into which a fixed lens fixedly positioned on the second lens group holding frame 42 on the side of an image plane is inserted, and on the nearer side of the image plane from the fixed lens insertion hole, a fixed lens housing 97 is formed.

Figure 4:
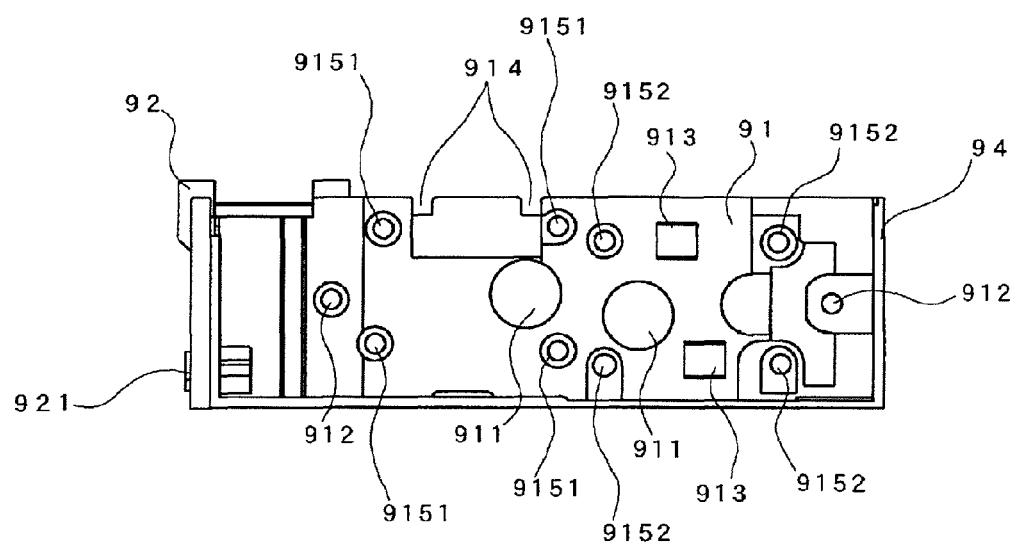
FIG. 4 is a side view of the housing shown in FIG. 3, seen from a third wall.

The third wall 91 provides a wall for separating the lens moving mechanism 2 from the motors 31, 32. Also, in the third wall 91, a plurality of windows is formed. FIG. 4 is a plan view showing the housing 9, seen from the third wall 91. In the third wall 91, as windows, output shaft windows 911 into which the output shafts 31*b*, 32*b* of the motors 31, 32 are inserted, respectively, motor fixing bosses 912 for fixing the motors 31, 32, position detection sensor windows 913, and mechanical stopper mounting portions 914 where a groove for latching a mechanical stopper 24 is formed.

The output shaft window 911 is the through hole used to connect drive force transmission means for transmitting drive force of the motors 31, 32 to the lens moving mechanism 2, to the output shafts 31*b*, 32*b* of the motor, and in the output shaft window 911, the output shafts 31*b*, 32*b* of the motor and the drive force transmission means are connected to each other.

The motor fixing bosses 912 are the openings having a bottom and formed on the side of the outer surface of the third wall 91 so as to correspond to installation positions of the motors 31, 32, respectively. The motor fixing bosses 912 can both position the motors 31, 32 and fix them directly on the lens housing 9S. Accordingly, through the lens housing 9S, the lens moving mechanism 2 and the motors 31, 32 are connected to each other, which, besides providing dust prevention, can allow the motors 31, 32 to be installed without affecting a layout of components of the lens moving mechanism 2. The position detection sensor window 913 and the mechanical stopper mounting portion 914 will be described hereinafter.

Further, the output shaft windows 911 can also position the installation positions of the motors 31, 32. That is, windows for output shaft fitting a shape of bearings (not shown) provided on the output shafts 31*b*, 32*b* of the motors 31, 32 may be formed correspondingly to the installation positions of the motors 31, 32, and the bearings of the output shafts 31*b*, 32*b* of the motors 31, 32 are inserted into the output shaft windows 911, respectively, which positions the motors 31, 32 on the third wall surface 91.

In the fourth wall 95, to dispose a flexible printed circuit board (hereinafter, it may be called "FPC") across the outside and the inside of the housing 9, FPC slits 951 are formed.

In addition, in the walls 91, 93, 94, 95 of the lens housing 9S, besides the above, windows into which various members are inserted to fix, or slits in which various members relating to the lens moving mechanism 2 are disposed may be optionally formed. Further, a position, shape, size and the like of the opening or the slit may be appropriately set dependent on design of the lens drive unit. However, to enhance dust resistance, the size of the opening or the slit is set dependently on that of a component to be disposed thereon, thus eliminating an unnecessary gap.

Now, a method for assembling the lens drive unit 1 will be described. First, the lens moving mechanism 2 is arranged in the lens housing 9S. Note that the perspective view of the housing 9 shown in FIG. 3 shows, for the illustrative purpose, a state in that the prism housing part 92 is installed in the lens housing 9S, and procedures of mounting are: the lens moving mechanism 2 is arranged in the lens housing 9S; and then the prism housing part 92 in which the prism 10 is arranged is fixed in the lens housing 9S by the machine screws 912.

First, the fixed lenses connected to each other in the second lens group holding frame 42 on the side of the image plane are inserted into the fixed lens insertion hole of the lens housing 9S to fit therein, and concurrently, the guide poles 51, 52 and the auxiliary guide pole 53 are inserted into guide pole insertion holes, respectively. After the fixed lenses and the guide poles are inserted to be arranged, the lens moving mechanism 2 is pushed into in the direction of the optical axis L to force the end of the first lens group holding frame 41 to abut on the holding window of the first wall 93. Next, a prism unit including the prism 10 is arranged in the prism housing part 92, and forced to abut on the first wall 93 of the lens housing 9S. Subsequently, the lens moving mechanism 2 is slightly pulled back to the first wall 93, and the other ends of the guide poles 51, 52 and the auxiliary guide pole 53 are inserted into guide pole insertion holes formed in the first wall 93, thus installing the lens moving mechanism 2 in the lens housing 9S. Next, the lens moving mechanism 2 is fixed on the first wall 93 by the machine screws 921. In this state, the prism 10 and the lens group included in the lens moving mechanism 2 are positioned so that their optical axes are aligned with each other.

Figure 5:
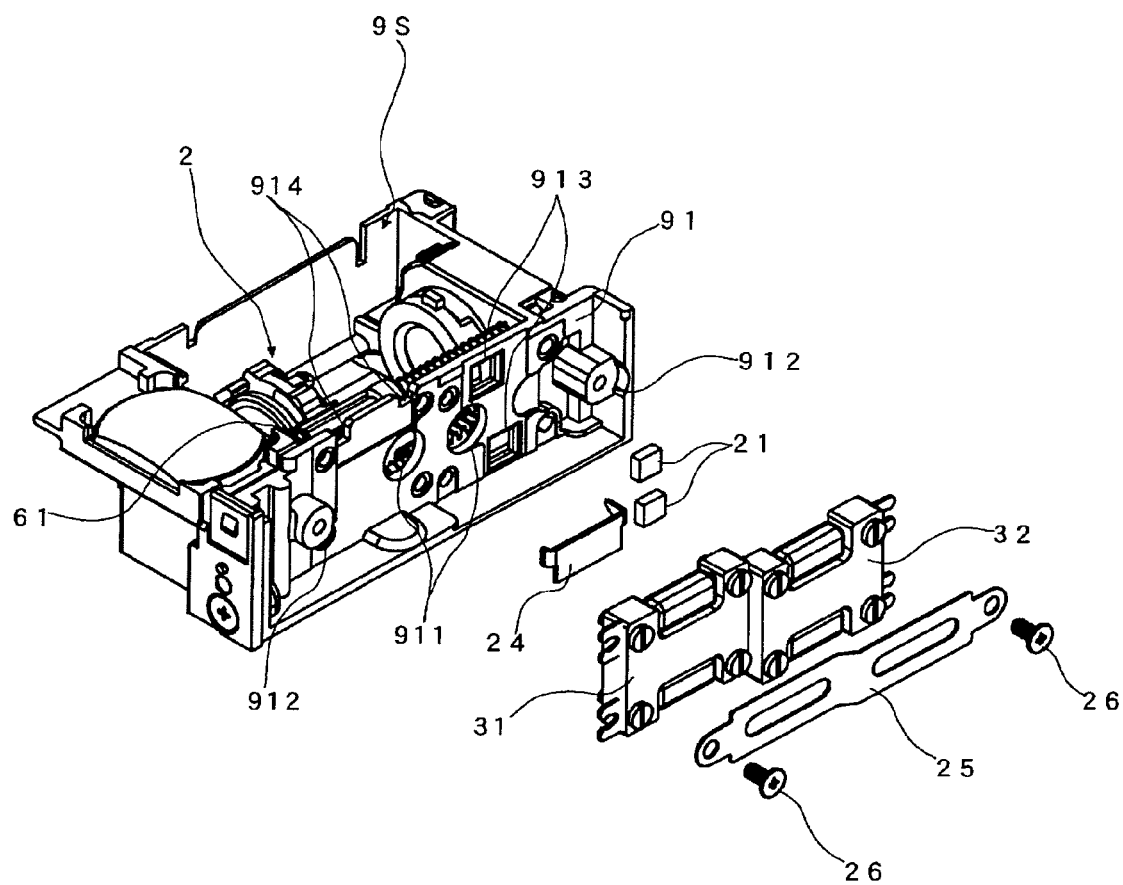
FIG. 5 is an exploded perspective view of the lens drive unit shown in FIG. 1 on the side of the third wall.

Next, the mechanical stoppers 24, reflection sensors 21, the motors 31, 32 are arranged. FIG. 5 is an exploded perspective view of the lens drive unit shown in FIG. 1, on the side of the third wall. Outside of the housing 9 on the side of the third wall 91, the motors 31, 32 are arranged and fixed. Further, between the third wall 91 and the motors 31, 32, the reflection sensors 21 and mechanical stoppers 24 are arranged.

The lens drive unit 1 includes, besides the lens moving mechanism 2 and the motors 31, 32, position detection means 20. The position detection means is composed of reflection patterns (not shown), reflection sensors 21 (position detection sensor) and a sensor board (not shown), and detects positions of the lens group holding frames 41, 42. The reflection patterns are provided on the side of the lens group holding frames 41, 42. The reflection sensor 21 is arranged in a position detection sensor window 913 formed on the third wall 91 of the housing 9 at a position facing the reflection pattern, and the sensor board connected to the reflection sensor 21 is arranged outside of the lens housing 9S. The sensor board controls operation of the motors 31, 32 based on position information of the lens group holding frames 41, 42 detected by the reflection sensor.

The reflection sensor 21 is arranged on the side of the lens group holding frames 41, 42 seen from the direction of the optical axis to detect displacement positions to which the lens group holding frames 41, 42 are moved slidingly. For the purpose, in the third wall 91 (partition), the position detection sensor windows 913 are formed to arrange the reflection sensors 21 therein. A planar partition (third wall 91) is, as this embodiment, formed at a position where it is in the vicinity of the lens group holding frames 41, 42 and parallel to the optical axis L, and the position detection sensor is mounted on the partition wall, which can accurately detect the displacement positions of the lens group holding frames 41, 42 that are moved in the direction of the optical axis L. That is, preferably, the partition (third wall 91) is arranged at the position where it is in the vicinity of the lens group holding frames 41, 42 and parallel to the optical axis L, and at least the position detection sensor windows 913 are formed at positions where they can face the reflection patterns in parallel, respectively.

The positions of the lens group holding frames 41, 42 are controlled in movement by the sensor board constituting the position detection means, and springs 22 are put around the guide poles 51, 52, and the springs 22 are brought into contact with the guide members 51, 52, which can provide a more stable sliding movement of the lens group holding frames 41, 42. That is, the lens group holding frames 2 are biased by the springs 22 toward one direction in sliding movement, which can reduce backlash and hysteresis.

Also, a stopper mechanism is provided in case of excessive sliding movement due to drive of the motors 31, 32 or a defect of the springs 22. The stopper mechanism is composed of a stopper receiving portion 23 provided on the side of the lens group holding frames 41, 42 and a mechanical stopper 24 provided on the side of the lens housing 9S. In this embodiment, the stopper receiving portion 23 is provided on the guide member 61, and the mechanical stopper 24 is provided on the partition (third wall 91) of the lens housing 9S to restrict a displacement range of the lens group holding frame 41.

In the present embodiment, the mechanical stopper 24 is used as a different component from the third wall 91 of the housing 9, and arranged on the mechanical stopper mounting portion 914 provided on the third wall 91.

The mechanical stopper 24 includes a structure capable of abutting on the stopper receiving portion 23 provided on the guide portions 61 of the lens group holding frame 41. That is, the mechanical stopper 24 is an approximately flat member in which two ends thereof are bent from the flat body in the same direction to be made approximately perpendicular, thus forming pawls. One of the pawls is formed at a position where it is able to contact on the stopper receiving portion 23 formed on the guide member and on the surface perpendicular to the movement direction of the guide member 61. The remaining one pawl is latched on the mechanical stopper mounting portion 914, thus providing a stable latching state of the mechanical stopper 24.

Figure 6:
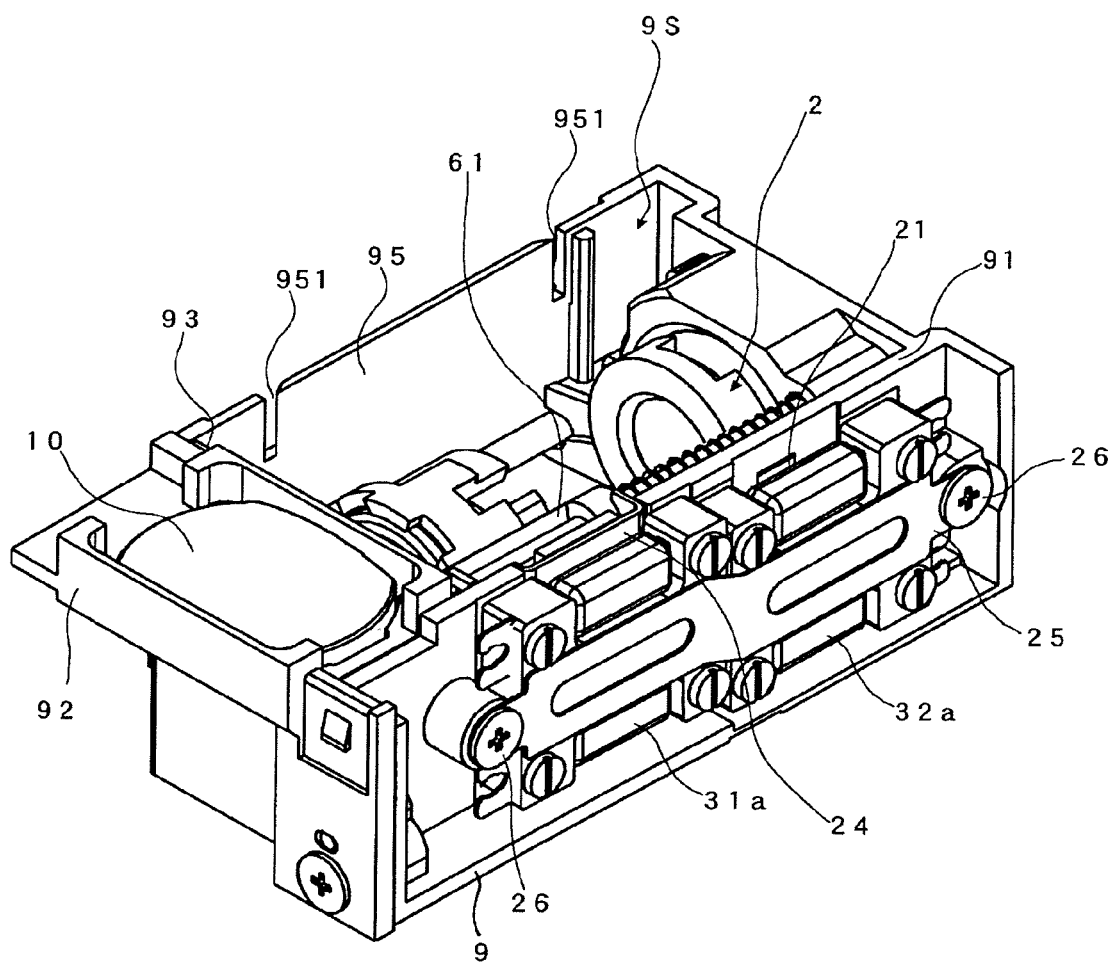
FIG. 6 is a perspective view of the lens drive unit shown in FIG. 1, seen from the third wall.
Figure 7:
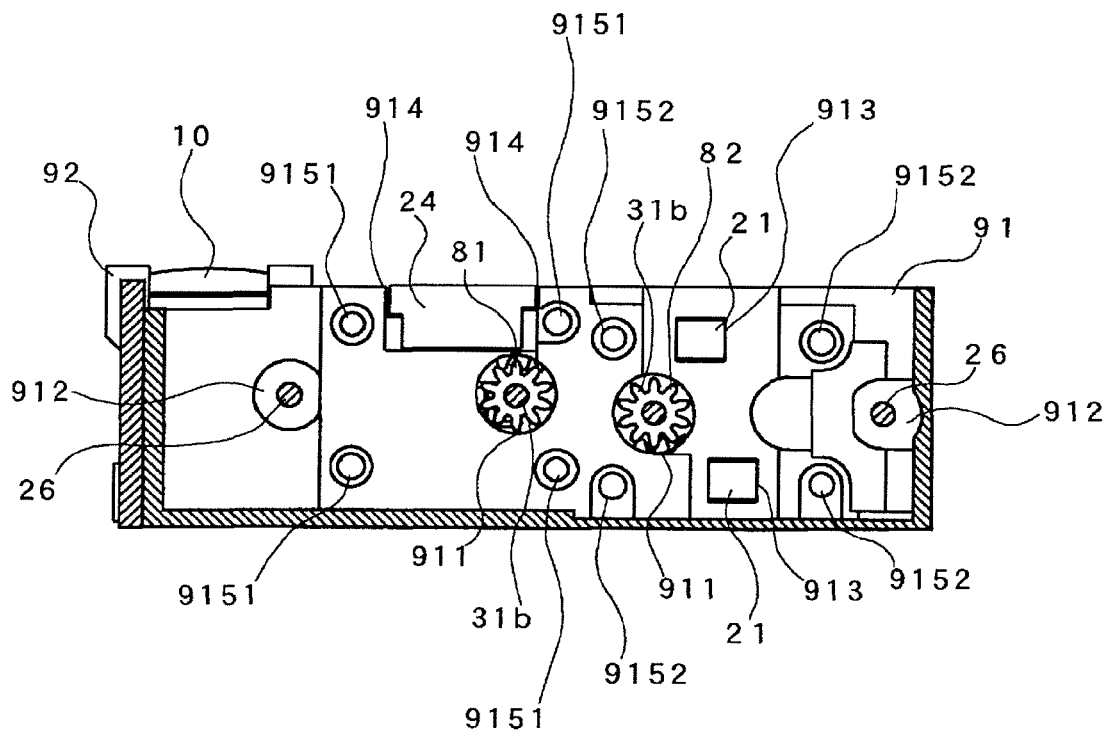
FIG. 7 is a cross-sectional view taken along the line A-A' in the lens drive unit shown in FIG. 1.

As shown in FIGS. 1 and 6, in the third wall 91, a recess is formed in a manner that it matches the shape and the thickness of the mechanical stopper 24, and the two pawls of the mechanical stopper 24 are inserted into the mechanical stopper mounting portions 914 provided on the third wall 91 of the housing 9 to latch thereon, respectively. At this time, on the side of the outer surface of the third wall 91 of the lens housing 9S, the mechanical stopper 24 becomes approximately flat with the third wall 91. Further, subsequently, fixing the motors 31, 32 presses the mechanical stopper 24 by the motor 31 while latching it on the third wall 91, thus fixing. The stopper mechanism causes the mechanical stopper 24 to attach on the stopper receiving portion 23 at a limit position in sliding movement of the lens group holding frame 41, which can restrict more excessive sliding movement.

Note that, in this embodiment, the mechanical stopper 24 has been configured to be latched on the mechanical stopper mounting portion 914 on the third wall 91, thus being fixed, but not limited to this, for example, the mechanical stopper may be formed directly inside of the third wall 91.

Before the motors 31, 32 are mounted on the third wall 91, the reflection sensor 21 is mounted. In the embodiment, the position detection sensor window 913 in the third wall 91 is formed so as to match the shape of the reflection sensor 21, the opening area of the position detection sensor window 913 on the side of the inner surface of the lens housing 9S is smaller than the area of an outer frame of the reflection sensor 21, and the reflection sensor 21 is inserted into the position detection sensor window 913 from the outside. Note that the thickness of the third wall 91 is set thicker than that of the reflection sensor 21, and accordingly the reflection sensor 21 inserted into the position detection sensor window 913 becomes buried in the third wall 91.

The motors 31, 32 are fixed on the third wall 91. The output shafts 31b, 32b of the motors 31, 32 are provided with the pinions 81, 82 by insertion to be linked therewith. First, the pinions 81, 82 are aligned with the output shaft windows 911 formed in third wall 91 and inserted thereinto, respectively, thus allowing motor bodies 31a, 32a to attach on the third wall 91.

Here, on abutting surfaces of the motor bodies 31a, 32a on the side of the third wall 91, positioning projections (not shown) are formed at four places, respectively. While, on the third wall 91, motor positioning holes 9151, 9152 for guiding positions at which the motors 31, 32 are mounted are formed at four places so as to match mounting positions of the first motor 31 and the second motor 32, respectively. The motor positioning holes 9151, 9152 are the recesses having a bottom, which do not penetrate in the thickness direction. The positioning projections of the motor bodies 31a, 32a are forced to attach on the motor positioning holes 9151, 9152, and thereby the mounting positions of the motors 31, 32 on the third wall 91 are positioned.

Next, as shown in FIGS. 5 and 6, the motors 31, 32 are held on the third wall 91 by a clamp 25. The motor fixing bosses 912 are formed to project, and their projection length corresponds to the thickness of the motor bodies 31a, 32a. The clamp 25 is a flat, elongated member, and on both end portions thereof, openings are formed that serve as washers matching the two motor fixing bosses 912 formed on the third wall 91. The windows for the clamp 25 are aligned with the motor fixing bosses 912, respectively, and the clamp 25 is fixed by machine screws 26, thus the motors 31, 32 are fixed between the clamp 25 and the third wall 91.

In the lens drive unit installation structure according to the present invention, the motor fixing bosses are formed to fix the motors 31a, 32a on the partition, thus enhancing accuracy in linking the motor with the lens moving mechanism. The motors 31, 32 are the drive source, so that drive force is likely to affect inevitably the motor bodies due to micro vibration or the like, but the motors are fixed on the motor fixing bosses 912 provided on the partition, which can suppress deviation of the motor output shafts caused by the micro vibration of the motor bodies.

In this embodiment, the method has been described that the motors 31, 32 are held by the clamp 25 to fix them on the third wall 91, but not limited to this, there may be a possible method that a washer portion is formed on the motor body and the motor body is directly fixed on the motor fixing bosses 912 using a machine screw.

Note that, in the assembling processes described above, a board such as an FPC, or various wirings are appropriately arranged at a predetermined position.

In the embodiment, using the flat motor, the drive transmission means has adopted the pinions linked with the output shafts 31b, 32b, and the racks, but the present invention is not limited to this. And the lens moving mechanism 2 arranged on the side of the lens group holding frame view from the direction of the optical axis and the motors as the drive source may be housed separately from each other. For example, even if drive transmission means other than the rack and pinion is used, a window for an output shaft into which the output shaft of the motor is inserted may be formed in the partition.

In the lens drive unit installation structure according to the present invention, the partition (third wall) constituting a part of the lens housing has all a plurality of applications that not only serves as a partition to separate the lens moving mechanism from the motor, but provides the through holes for connecting the motor to the drive transmission means, the position detection means, the stopper mechanism or the like on this partition, and further fixes the motor. In such a manner, the lens moving mechanism and the motors are housed separately from each other, which can not only provide a superior dust resistance, but facilitate positioning, and further make it easier to lay out components.

The lens drive unit installation structure according to the present invention can allow the drive source from components of the lens drive unit to be housed separately from others, which can provide a superior dust resistance, and be used suitably for an image pickup device of a camera, a measuring apparatus or the like used in an dusty environment.

What is claimed is:

1. A lens drive unit installation structure for installing a lens drive unit including: a lens holding frame for holding a lens, and a lens moving mechanism for slidingly moving the lens holding frame in the direction of an optical axis using a drive source, wherein
    the drive source to be linked with the lens moving mechanism is arranged on the side of the lens holding frame view from the direction of the optical axis, and
    a partition provided with a window for pass through of an output shaft of said drive source to be linked with the lens moving mechanism is set between the lens holding frame and the drive source, with the lens and the drive source arranged separately from each other.

2. The lens drive unit installation structure according to claim 1, wherein
    the lens holding frame are housed in the lens housing,
    the partition is a part of the lens housing.

3. The lens drive unit installation structure according to claim 1, wherein
    a motor as the drive source is arranged outside of and adjacent to the partition,
    a window for pass through an output shaft is formed in the partition, and
    a bearing for an output shaft of the motor is put into the window by insertion, thereby the motor is positioned to the partition.

4. The lens drive unit installation structure according to claim 1, wherein
    the lens holding frame and the lens moving mechanism are housed in the lens housing,
    a motor as the drive source is arranged outside of and adjacent to the lens housing,
    a window for pass through an output shaft is formed in a wall of the lens housing on the side where the motor is arranged, and
    the motor is arranged separately in a state that drive transmission means provided in the lens moving mechanism for transmitting drive force of the motor to the lens holding frame and the motor are connected to each other at the window for output shaft.

5. The lens drive unit installation structure according to claim 1, wherein a drive source fixing boss to fix the motor is formed in the partition.

6. The lens drive unit installation structure according to claim 1, further comprising:
a window for a position detection sensor is formed in the partition to arrange the position detection sensor detecting a displacement position of the lens holding frame.

7. The lens drive unit installation structure according to claim 1, further comprising:
a mechanical stopper mounting portion provided on the partition to set a mechanical stopper which restrict a displacement range of the lens group holding frame.

8. A lens drive unit using the lens drive unit installation structure according to claim 1.

9. The lens drive unit installation structure according to claim 1, wherein the output shaft of the drive source is arranged to be perpendicular to the optical axis.

10. A lens drive unit installation structure for installing a lens drive unit including: a lens holding frame for holding a lens, and a lens moving mechanism for slidingly moving the lens holding frame in the direction of an optical axis using a drive source, wherein
the lens moving mechanism and the drive source to be linked with it are arranged on the side of the lens holding frame viewed from the direction of the optical axis, and
a partition provided with a window for pass through of an output shaft of said drive source to be linked with the lens moving mechanism is set between the lens moving mechanism and the drive source, with the lens and the drive source arranged separately from each other.

11. The lens drive unit installation structure according to claim 10, wherein
the lens holding frame are housed in the lens housing,
the partition is a part of the lens housing.

12. The lens drive unit installation structure according to claim 10, wherein
a motor as the drive source is arranged outside of and adjacent to the partition,
a window for pass through an output shaft is formed in the partition, and
a bearing for an output shaft of the motor is put into the window by insertion, thereby the motor is positioned to the partition.

13. The lens drive unit installation structure according to claim 10, wherein
the lens holding frame and the lens moving mechanism are housed in the lens housing,
a motor as the drive source is arranged outside of and adjacent to the lens housing,
a window for pass through an output shaft is formed in a wall of the lens housing on the side where the motor is arranged, and
the motor is arranged separately in a state that drive transmission means provided in the lens moving mechanism for transmitting drive force of the motor to the lens holding frame and the motor are connected to each other at the window for output shaft.

14. The lens drive unit installation structure according to claim 10, wherein
a drive source fixing boss to fix the motor is formed in the partition.

15. The lens drive unit installation structure according to claim 10, further comprising:
a window for a position detection sensor is formed in the partition to arrange the position detection sensor detecting a displacement position of the lens holding frame.

16. The lens drive unit installation structure according to claim 10, further comprising:
a mechanical stopper mounting portion provided on the partition to set a mechanical stopper which restrict a displacement range of the lens group holding frame.

17. A lens drive unit using the lens drive unit installation structure according to claim 10.

18. The lens drive unit installation structure according to claim 10, wherein the output shaft of the drive source is arranged to be perpendicular to the optical axis.

19. A lens drive unit installation structure for installing a lens drive unit including:
a lens holding frame for holding a lens, and a lens moving mechanism for slidingly moving the lens holding frame in the direction of an optical axis using a drive source, wherein
the drive source to be linked with the lens moving mechanism is arranged on the side of the lens holding frame viewed from the direction of the optical axis,
a partition is set between the lens holding frame and the drive source, with the lens and the drive source arranged separately from each other,
the lens holding frame and the lens moving mechanism are housed in the partition,
a motor as the drive source is arranged outside of and adjacent to the lens housing,
a window for pass through of an output shaft is formed in the partition on the side where the motor is arranged, and
the motor is arranged separately in a state that drive transmission means provided in the lens moving mechanism for transmitting drive force of the motor to the lens holding frame and the motor are connected to each other at the window for the output shaft.

20. A lens drive unit installation structure for installing a lens drive unit including: a lens holding frame for holding a lens, and a lens moving mechanism for slidingly moving the lens holding frame in the direction of an optical axis using a drive source, wherein
the drive source to be linked with the lens moving mechanism is arranged on the side of the lens holding frame viewed from the direction of the optical axis, and
a partition is set between the lens moving mechanism and the drive source, with the lens and the drive source arranged separately from each other,
the lens holding frame and the lens moving mechanism are housed in the lens housing,
a motor as the drive source is arranged outside of and adjacent to the lens housing,
a window for pass through of an output shaft is formed in a partition on the side where the motor is arranged, and
the motor is arranged separately in a state that drive transmission means provided in the lens moving mechanism for transmitting drive force of the motor to the lens holding frame and the motor are connected to each other at the window for the output shaft.

* * * * *